United States Patent [19]

Norman

[11] 3,971,067

[45] July 20, 1976

[54] AUTOMATIC BEAM CURRENT LIMITER

[75] Inventor: Marvin Neil Norman, Indianapolis, Ind.

[73] Assignee: RCA Corporation, New York, N.Y.

[22] Filed: May 23, 1975

[21] Appl. No.: 580,356

[52] U.S. Cl. ................................................ 358/74
[51] Int. Cl.² ......................................... H04N 9/52
[58] Field of Search................ 178/7.5 R; 358/30, 74

[56] References Cited
UNITED STATES PATENTS

| | | | |
|---|---|---|---|
| 3,465,095 | 9/1969 | Hansen et al. | 358/74 |
| 3,644,669 | 2/1972 | Slavik | 178/7.5 R |
| 3,663,745 | 5/1972 | O'Toole | 358/30 |
| 3,674,932 | 7/1972 | Griepentrog | 178/7.5 |
| 3,873,767 | 3/1975 | Okada et al. | 178/7.5 |

*Primary Examiner*—George H. Libman
*Assistant Examiner*—Aristotelis M. Psitos
*Attorney, Agent, or Firm*—Eugene M. Whitacre; Peter M. Emanuel

[57] ABSTRACT

An amplifier for combining color difference signals with luminance signals and for driving a color image reproducing device includes first and second transistors of opposite conductivity type. Color difference signals are coupled to the base of the first transistor. The emitter of the first transistor is direct current coupled to the emitter of the second transistor. Luminance signals are coupled to the base of the second transistor. Color signals developed at the collector of the first transistor are coupled to the image reproducer. A clamping circuit operates during the horizontal retrace interval to clamp the emitter of the first transistor to a voltage to control the operating point of the amplifier. The voltage is related to the magnitude of the electron beam current drawn by the image reproducer in a manner such that after a predetermined amount of beam current has been drawn, the generation of the electron beam is increasingly inhibited with increasing beam current. Since the amplifier which is controlled is supplied with both luminance and chrominance signals, excessive beam currents due to chrominance signals, as well as luminance signals, are inhibited.

14 Claims, 1 Drawing Figure

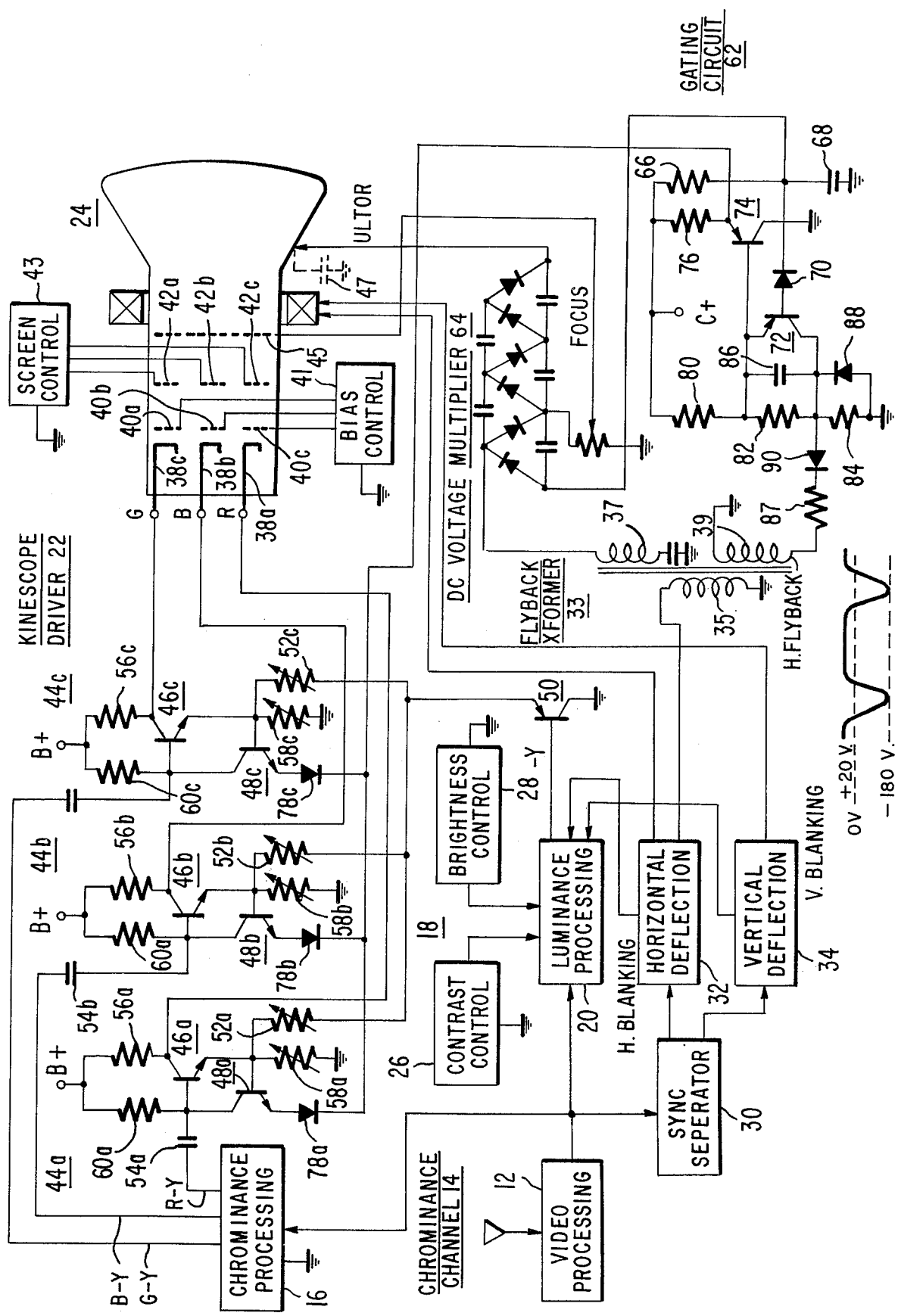

AUTOMATIC BEAM CURRENT LIMITER

The present invention relates to load current limiting circuits and, in particular, relates to circuits for limiting the electron beam current drawn by an image reproducing kinescope or similar device.

High operating voltages are coupled to the focus and ultor electrodes of an image reproducing kinescope included in a television receiver to provide images of high light intensity (brightness). The magnitude of the electron beam current drawn from the source of the high voltages, which is normally high, may become excessive depending on the particular content of the signals coupled to the kinescope to control the generation of electron beams.

Although excessive beam currents may occur in black and white television receivers, they more frequently occur in color television receivers because of the relatively higher operating voltages which are coupled to color image reproducing kinescopes and because color receivers frequently utilize DC coupling of video signals.

Excessive beam currents may cause a number of undesirable effects including a degradation of the performance of the receiver's deflection system, picture blooming (the picture growing brighter and darker with changes in scene content) and spot defocussing (an increase in the electron beam's diameter). In essence, excessive beam current may cause the receiver to produce an image which is incapable of being enjoyably viewed.

Some examples of circuits for limiting beam current are described in U.S. Pat. No. 3,465,095 entitled "Automatic Beam Intensity Limiter," issued to R. B. Hansen et al. on Sept. 2, 1969; U.S. Pat. No. 3,541,240 entitled "Automatic Beam Current Limiting Using Reference Current Sources," issued to E. W. Curtis on Nov. 17, 1970 and assigned to the same assignee as the present invention; and U.S. Pat. No. 3,619,705 entitled "Automatic Beam Current Limiter Circuitry," issued to G. C. Waybright on Nov. 9, 1971.

It is desirable that a beam current limiting circuit intended for use in a color television receiver be operatively associated with both luminance and chrominance signal processing circuits to inhibit excessive beam current since such beam current may be produced in response to chrominance signals as well as in response to luminance signals. For instance, excessive beam current may occur due to reproduction of a solid field of one color, which would not necessarily be accompanied by an excessive luminance signal, as well as to high brightness white image portions which are represented by high level luminance signals.

In accordance with the present invention, a beam current limiting apparatus provided for a system for processing television signals including a luminance channel for processing luminance signals, a chrominance channel for deriving color difference signals from chrominance signals, a kinescope including plural color electron beam forming apparatus, and high voltage supplying means for providing operating potential to the kinescope. The beam current limiting apparatus includes means for deriving a control signal representing the magnitude of the current drawn by the kinescope from the high voltage supplying means. Amplifying means are provided for combining the color difference signals with the luminance signals to derive color signals. The color signals are coupled to the electron beam forming apparatus of the kinescope to control the generation of electron beams. Means for controlling the operating point of the amplifying means in response to the control signal are associated with the amplifying means. The operating point of the amplifying means is controlled to increasingly inhibit the generation of electron beams in a direct relationship to the magnitude of the current drawn by the kinescope.

In accordance with another feature of the present invention, the means for controlling the operating point of the amplifying means includes clamping means for periodically clamping a predetermined circuit point of the amplifying means to the control voltage.

These and other aspects of the present invention may be understood by the following detailed description in conjunction with the accompanying drawing which shows, partially in block diagram form and partially in schematic diagram form, the general arrangement of a color television receiver employing an apparatus constructed in accordance with the present invention.

Referring to the drawing, a color television receiver employing the present invention includes a video processing unit 12 responsive to radio frequency (RF) television signals for generating, by means of suitable intermediate frequency circuits (not shown) and detection circuits (not shown), a composite video signal comprising chrominance, luminance, sound and synchronizing portions. The output of signal processing unit 12 is coupled to a chrominance channel 14, including a chrominance processing unit 16 and to a luminance channel 18, including a luminance processing unit 20.

Chrominance processing unit 16 includes chroma demodulators (not shown) to derive color difference signals representing, for example, R–Y, B–Y and G–Y information. These color difference signals are applied to kinescope driver 22, including stages 44a, 44b and 44c, where they are matrixed with the output signal, –Y, of luminance processing circuit 20 to produce color signals representing, for example, red (R), blue (B) and green (G) information. The color signals are coupled to kinescope 24.

Kinescope 24 may, for example, be a multi-gun kinescope such as a delta-gun, shadow or slotted mask, or precision in-line kinescope or the like. Kinescope 24 contains a gun to generate and modulate an electron beam for each different phosphor, for instance, red, green and blue, deposited on the inside of the face of kinescope 24. As illustrated, each gun comprises a respective cathode 38a, 38b and 38c; control grid 40a, 40b and 40c; and screen grid 42a, 42b and 42c. Kinescope 24 also includes a focus electrode 45 and an ultor electrode, represented by a capacitor 47, to accelerate the electron beams generated by the electron guns.

Bias control voltages are coupled to control grids 40a, 40b and 40c from bias control unit 41 and screen control voltages are coupled to screen grids 42a, 42b and 42c from screen control unit 43 to adjust the cut off point of each gun.

Luminance processing unit 20 serves to amplify and otherwise process the video signals to produce luminance signal –Y.

A contrast control unit 26 is coupled to luminance processing unit 20 to control the amplitude of the luminance signal while a brightness control unit 28 is coupled to luminance processing unit 20 to control the DC component of the luminance signal.

The output signal of video processing unit 12 is also coupled to a sync separator 30 which separates horizontal and vertical synchronization pulses from the composite video signal. The synchronization pulses are coupled to a horizontal deflection circuit 32 and a vertical deflection circuit 34. Deflection circuits 32 and 34 are coupled to kinescope 24 to control the deflection of electron beams generated by kinescope 24.

One or more electron beams are horizontally deflected to produce horizontal trace lines on the screen of the kinescope which are modulated in accordance with the video signals during "horizontal trace" intervals. When an electron beam has reached the end of a horizontal line, it is rapidly deflected back to the beginning of the next horizontal line during a "horizontal retrace" interval. The beam is also vertically deflected at a slower rate in the vertical direction to produce the desired raster.

Deflection circuits 32 and 34 also generate horizontal and vertical blanking signals having durations respectively corresponding to the durations of the horizontal and vertical retrace intervals. The blanking signals are coupled to luminance processing unit 20 where they are combined with the luminance signals. The blanking pulses extend in the black direction of the luminance signal —Y (e.g., positive direction) and tend to inhibit the generation of electron beams by kinescope 24 during the horizontal and vertical retrace intervals.

A horizontal flyback signal, generated by horizontal deflection circuit 32, is coupled to the primary winding 35 of a horizontal flyback transformer 33. Secondary winding 37 of horizontal flyback transformer 33 is capacitively coupled between ground and a DC voltage multiplier 64, shown as a voltage tripler. DC multiplier 64 serves to generate, in response to the horizontal flyback signal, the high voltages required for focus and ultor electrodes 45, 47 of kinescope 24 in a conventional manner.

The horizontal flyback signal is also coupled through a tertiary winding 39 of horizontal flyback transformer 33 to a gating circuit 62. The negative pulses of the horizontal flyback signal normally arise in time synchronism with the horizontal blanking pulses, i.e., they occur during the horizontal retrace interval. Gating circuit 62 serves to generate a control signal to control the operating point of stages 44a, 44b and 44c of kinescope driver 22 during the horizontal retrace interval in accordance with the magnitude of the kinescope beam current drawn from DC voltage multiplier 64.

Kinescope driver 22 includes stages 44a, 44b and 44c to drive, respectively, each gun of kinescope 24. Since the stages are similar, only stage 44a will be described in detail. Stage 44a comprises an NPN transistor 46a and an NPN transistor 48a. A PNP luminance amplifier transistor 50 is commonly coupled to all three stages 44a, 44b and 44c.

With respect to stage 44a, opposite conductivity type transistors 46a and 50 have their emitter electrodes coupled together through a variable drive control resistor 52a. The base of transistor 46a is coupled through a capacitor 54a to the R-Y output of chrominance processing unit 16. The base of transistor 50 is direct current coupled to the output of luminance processing unit 20. The collector of transistor 46a is coupled through a resistor 56a to a source of positive operating voltage B+. The emitter of transistor 46a is coupled through a variable bias control resistor 58a to ground. The collector of transistor 46a is direct current coupled to the cathode 38a of the red (R) gun of kinescope 24.

Transistors 46a and 50 cooperate to combine the R-Y color difference signal and the —Y luminance signal to produce a color signal representing red (R) at the collector of transistor 46a. Transistor 46a operates in a common emitter mode to amplify the R-Y color difference signal. By virtue of the emitter coupling of transistors 46a and 50, transistor 46a operates in a common base mode to amplify luminance signal —Y. The signals representing red (R), blue (B) and green (G), developed at the respective collectors of transistors 46a, 46b and 46c, are respectively coupled to the cathodes 38a, 38b and 38c.

An NPN transistor 48a is arranged in a feedback relation with NPN transistor 46a, and the combination is coupled to a capacitor 54a and a resistor 60a to form a clamping circuit to maintain the operating point of stage 44a substantially independent of the DC conditions of the R-Y output of chrominance processing unit 16 and the base-to-emitter voltage variations of transistor 46a. The base of transistor 48a is direct current coupled to the emitter of transistor 46a. The collector of transistor 48a is direct current coupled to the base of transistor 46a.

The emitter of transistor 48a is coupled to the emitter of PNP transistor 74 of gating circuit 62 through a diode 78a. Diode 78a serves to inhibit reverse breakdown of the base-to-emitter junction of transistor 48a. When gating circuit 62 couples a control voltage to the emitter of transistor 48a during each horizontal retrace interval, transistor 48a is rendered conductive and cooperates with transistor 46a and capacitor 54a to clamp the emitter of transistor 46a to a voltage (the control voltage plus the voltage developed between the anode and cathode of diode 78a plus the base-to-emitter voltage of transistor 48a) substantially independent of the DC conditions of the R-Y output of chrominance processing unit 16 and substantially independent of temperature induced variations of the base-to-emitter voltage of transistor 46a. A detailed description of the operation of stage 44a is provided in U.S. Pat. application Ser. No. 504,357 entitled "Circuit for Maintaining Operating Point Stability of an Amplifier," filed by D. H. Willis on Sept. 9, 1974 and assigned to the same assignee as the present invention.

Since the operating point of stage 44a is determined by the voltage developed at the emitter of transistor 46a, the operating point of stage 44a will be maintained substantially independent of the DC conditions of the R-Y output of chrominance processing unit 16 and of the base-to-emitter voltage of transistor 46a. Similarly, the operating point of stage 44b will be maintained substantially independent of the DC conditions of the B-Y output of chrominance processing unit 16, and the base-to-emitter voltage of transistor 46b and the operating point of stage 44c will be maintained substantially independent of the DC conditions of the G-Y output of chrominance processing unit 16 and the base-to-emitter voltage of transistor 46c.

Gating circuit 62 includes a resistor 66 coupled between source of positive supply voltage C+ and multiplier 64. A capacitor 68 is coupled between the junction of multiplier 64 and resistor 66 to ground and serves, in conjunction with resistor 66, to filter beam current drawn through resistor 66 from the cource C+.

The junction of resistor 66 and capacitor 68 is coupled through a diode 70 to the base of a PNP transistor 72. A voltage divider comprising resistors 80, 82 and 84 is coupled between C+ and ground. The emitter of PNP transistor 72 is coupled to the junction of resistors 80 and 82 while its collector is coupled to the junction of resistors 82 and 84. A capacitor 86 is coupled across resistor 82. Diode 70 is poled so that it and transistor 72 are rendered conductive when the voltage developed at its cathode falls below a predetermined value.

The horizontal flyback signal provided by tertiary winding 39 is coupled to the junction of resistor 82 and 84 through the series connection of resistor 87 and diode 90. Diode 88 is coupled across resistor 84. Diodes 88 and 90 are poled, and the values of resistors 80, 82, 84 and 87 are selected so that diodes 88 and 90 are nonconductive during the positive portions of the horizontal flyback signal (horizontal trace interval) and conductive during the negative portions (horizontal retrace interval).

The emitter of PNP transistor 72 is coupled to the base of PNP transistor 74. The collector of transistor 74 is coupled to ground. The emitter of transistor 74 is coupled through resistor 76 to C+ and the emitters of transistors 48a, 48b and 48c through respective diodes 78a, 78b and 78c.

Typical values for portions of the receiver shown in the diagram are listed below:

| | |
|---|---|
| Voltage B+ | +240 volts DC |
| Variable Resistor 52a | 100 ohms (nominal) |
| Capacitor 54a | 4.7 microfarads |
| Resistor 56a | 8.2 kilohms |
| Variable Resistor 58a | 1.2 kilohms (nominal) |
| Resistor 60a | 560 kilohms |
| Voltage C+ | +28 volts DC |
| Resistor 66 | selected as described below |
| Capacitor 68 | 10 microfarads |
| Resistor 76 | 2.2 kilohms |
| Resistor 80 | 39 kilohms |
| Resistor 82 | 8.2 kilohms |
| Resistor 84 | 18 kilohms |
| Resistor 87 | 22 kilohms |

The general arrangement shown in FIG. 1 is suitable for use in a color television receiver of the type shown, for example, in *RCA Color Television Service Data* 1973 No. C-8 for CTC-68 type receiver published by RCA Corporation, Indianapolis, Ind.

In operation, during the horizontal trace interval, the positive portion (e.g., a +20 volt DC level) of the horizontal flyback signal shown in the drawing is coupled to the cathode of diode 90. Current flows from C+ through resistors 80, 82 and 84 to ground and a first positive voltage is developed at the junction of resistors 80 and 82. A second positive voltage is also developed at the junction of resistors 82 and 84 (the cathode of diode 88). This second voltage is less positive than the first voltage and is also less positive than the voltage developed at the cathode of diode 90. Diode 90 is therefore back-biased and non-conductive. Diode 88 also is back-biased and non-conductive. Capacitor 86 charges to and stores the voltage developed across resistor 82. The first voltage developed at the junction of resistors 80 and 82 is coupled through transistor 74, arranged as an emitter-follower, to the cathodes of diodes 78a, 78b and 78c. The first voltage developed at the junction of resistors 80 and 82 is sufficiently great to render diodes 78a, 78b and 78c and transistors 48a, 48b and 48c non-conductive.

The voltage developed at the cathode of diode 70 is determined by the magnitude of the kinescope beam current drawn through resistor 66. The voltage at the cathode of diode 70 decreases with increases in beam current. Normally non-conductive transistor 72 is rendered conductive when the voltage at the cathode of diode 70 falls below the first voltage developed at the junction of resistors 80 and 82 (emitter of transistor 72) less a voltage equal to the sum of the voltages that are developed between the emitter and base of transistor 72 and the anode and cathode of diode 70 when transistor 72 and diode 70 are conductive. The value of resistor 66 may be selected to determine the magnitude of beam current which will initiate the conduction of transistor 72. The impedance between the emitter and collector of transistor 72 after it is rendered conductive is determined by the magnitude of the voltage developed at the cathode of diode 70. The impedance between the emitter and collector of transistor 72 decreases with decreases in the magnitude of the voltages developed at the cathodes of diodes 70, i.e., the impedance between the emitter and collector of transistor 72 decreases with increases in the magnitude of the beam current. Since the magnitude of the voltage stored by capacitor 86 depends on the impedance between the junction of resistors 80 and 82 and the junction of resistors 82 and 84, the magnitude of voltage stored by capacitor 86 decreases with increases in the magnitude of the beam current.

It is noted that although the voltages developed between the junction of resistors 80 and 82 and the junction of resistors 82 and 84 vary as a function of beam current, the values of resistors 80, 82 and 84 are desirably selected so that the voltage developed from the junction of resistors 80 and 82 to ground is large enough during the horizntal trace interval to ensure that the voltage coupled to the emitters of transistor 48a, 48b and 48c renders them non-conductive at that time.

During the horizontal retrace interval, the negative portion (e.g., −180 volt pulse) of the horizontal flyback signal is coupled to the cathode of diode 90, thereby forward-biasing diodes 90 and 88. The voltage developed at the junction of resistors 82 and 84 falls to a voltage equal to that developed between the cathode and anode of diode 88. Since the voltage across capacitor 86 cannot change instantaneously, the voltage coupled to the cathodes of diodes 78a, 78b and 78c falls to a voltage equal to the voltage developed across capacitor 86 during the horizontal trace interval plus the voltage developed between the cathode and anode of diode 88 and the voltage developed between the emitter and base of transistor 74.

The values of resistors 80, 82 and 84 are selected so that when transistor 72 is non-conductive, i.e., when excessive beam current has not been drawn during a horizontal trace interval, the voltage developed across capacitor 86 and coupled to the cathodes of diodes 78a, 78b and 78c during the horizontal retrace interval is sufficiently low to render diodes 78a, 78b and 78c and transistors 48a, 48b and 48c conductive. Therefore, if the voltage developed across capacitor 86 decreases in response to an increase in beam current during a horizontal trace interval, the voltage coupled to the cathodes of diodes 78a, 78b and 78c during the horizontal retrace interval will be lower than the voltage coupled to the cathodes of diodes 78a, 78b and 78c if excessive beam current had not been drawn during the horizontal trace interval. As a result, transistors 48a, 48b and 48c will be rendered more conductive after a trace interval in which excessive beam current has been drawn than after a trace interval in which excessive beam current has not been drawn. The particular magnitude of the voltage coupled to the cathodes of diodes 78a, 78b and 78c during the horizontal retrace interval depends on the particular magnitude of the excessive beam current drawn during the previous horizontal trace interval.

The voltages developed at the base of transistors 46a, 46b and 46c during the horizontal retrace interval decrease, respectively, with an increase in the conduction of transistors 48a, 48b and 48c. Therefore, the emitters of transistors 46a, 46b and 46c will be clamped to a voltage during the horizontal retrace interval which decreases with increases in the magnitude of the beam current drawn by kinescope 24. The respective conduction of transistors 46a, 46b and 46c, and therefore, the voltage developed at the respective collectors of transistors 46a, 46b and 46c, increases with decreases in the respective emitter voltages of transistors 46a, 46b and 46c. As the collector voltages of transistors 46a, 46b and 46c, i.e., the respective voltages at cathodes 38a, 38b and 38c, increase the generation of electron beams by respective electron guns of kinescope 24 is increasingly inhibited and the beam current drawn by kinescope 24 correspondingly decreases.

Because of the gain of transistor 72, gating circuit 72 responds quickly to changes in beam current. If a slower response to changes in beam current is desired or if it is desired to reduce the cost of gating circuit 62, transistor 72 may be omitted. In that case, the anode of diode 70 should be coupled to the junction of resistors 80 and 82 and the cathode of diode 70 should be coupled to the junction of resistor 66 and capacitor 68. It is also noted that although transistor 74 has been described as conducting during both the horizontal trace and horizontal retrace intervals, the circuit arrangement of transistor 74 may be modified so that transistor 74 is non-conductive during the horizontal trace interval and conductive during the horizontal retrace interval. Such an arrangement is described in co-pending U.S. Pat. application Ser. No. 580,688 entitled "Gating Circuit for a Video Driver Including a Clamping Circuit," filed on May 23, 1975 by D. H. Willis wherein a transistor similarly arranged as transistor 74 couples a signal to a kinescope to render it cut off during the horizontal trace portions of the vertical retrace interval.

Further, although the invention has been described in terms of a particular kinescope driver and clamping arrangement, other arrangements may also be utilized. It is intended that these and other modifications of the arrangement as well as those shown and described are included within the scope of the present invention.

What is claimed is:

1. In a system for processing television video signals, said signals including chrominance, luminance and synchronizing signals, said system including a luminance channel for processing said luminance signals, a chrominance channel for deriving color difference signals from said chrominance signals, an image reproducing device, high voltage supplying means for providing operating potential for said image reproducing device, and deflection means responsive to said synchronizing signals for scanning said device in a regular pattern including trace and retrace intervals, an apparatus comprising:
    means for deriving a control voltage representing the magnitude of current drawn by said image reproducing device from said high voltage supplying means;
    amplifying means for combining said luminance signals and said chrominance signals to derive color signals, said amplifying means coupling said color signals to said image reproducing device;
    clamping means coupled to said amplifying means for clamping a predetermined circuit point of said amplifying means to said control voltage and thereby control the operating point of said amplifying means, said operating point being controlled so as to reduce the amplitude of said color signals in direct relationship to the magnitude of said current drawn by said image reproducing device.

2. The apparatus recited in claim 1 wherein said clamping means is normally inoperative and wherein said means for deriving said control voltage includes gating means for selectively rendering said clamping means operative.

3. The apparatus recited in claim 2 wherein said clamping circuit is coupled to said deflection means and rendered operative during said retrace interval.

4. The apparatus recited in claim 3 wherein said amplifying means includes three transistors of a first type, said chrominance signals being coupled to the base of each of said first transistors, the collector of each of said first transistors being coupled to said image reproducing device; and a second transistor of opposite conductivity type to that of said first transistors, the emitters of each of said first transistors being directly coupled to the emitter of said second transistor, said luminance signals being coupled to the base of said second transistor.

5. The apparatus recited in claim 3 wherein said image reproducing device includes a kinescope having a plurality of color electron beam producing apparatus and wherein said amplifying means includes a plurality of first transistors, said chrominance signals being coupled to the base of each of said first transistors, the collector of each of said first transistors being coupled to a predetermined one of said plurality of color electron beam producing apparatus; and a second transistor of opposite conductivity type to that of said first transistors, the emitter of each of said first transistors being direct current coupled to the emitter of said second transistor, said luminance signals being coupled to the base of said second transistor.

6. The apparatus recited in claim 5 wherein said clamping means includes a plurality of means for capacitively coupling said chrominance signals to the base of each of said first transistors; and a plurality of third transistors of like conductivity type to that of said first transistors, the base of each of said third transistors being respectively direct current coupled to the emitter of each of said first transistors, the collector of each of said third transistors being respectively direct current coupled to the base of each of said first transistors, the emitter of each of said third transistors being coupled to said gating means.

7. The apparatus recited in claim 6 wherein said gating means couples as first voltage to the emitters of the third transistors during said trace intervals to render said third transistors non-conductive and a second voltage to the emitters of the third transistors during said retrace intervals to render said third transistors conductive, said first and third transistors respectively cooperating to clamp the emitters of said first transistors to said second voltage during said horizontal retrace interval, said second voltage being controlled in accordance with the magnitude of the current drawn by said kinescope.

8. The apparatus recited in claim 7 wherein said means for deriving said control voltage includes:
   voltage divider means including first, second and third terminals for developing a voltage between said first and third terminals and another voltage between said first and second terminals, the voltage developed between said second and third terminals being a portion of the voltage developed between said first and third terminals;
   means for coupling the voltage developed between said first and third terminals to the emitters of said third transistors;
   means coupled between the first and second terminals for controlling the voltage developed there between in accordance with the magnitude of the current drawn by said kinescope during said trace intervals; and
   means coupled to said deflection means for bypassing the voltage developed between said second and third terminals during said retrace intervals.

9. The apparatus recited in claim 8 wherein capacitive means are coupled between said first and second terminals for storing the voltage developed therebetween.

10. The apparatus recited in claim 9 wherein said means for deriving a control voltage representing the magnitude of current drawn from said high voltage supply means includes a resistance device included in a circuit path coupled between said kinescope and said high voltage supplying means, the voltage developed across said resistance device being directly related to the magnitude of the current drawn by said kinescope.

11. The apparatus recited in claim 10 wherein said means for controlling the voltage developed across said first and second terminals includes a semiconductor device being controlled in response to the magnitude of voltage developed across said resistance device.

12. The apparatus recited in claim 11 wherein said semiconductor device is a fourth transistor, the emitter of said transistor being coupled to one of said first and second terminals, the collector of said transistor being coupled to the other of said first and second terminals, the base of the transistor being coupled to said resistance device.

13. The apparatus recited in claim 8 wherein said means for coupling the voltage developed between said first and third terminals to the emitters of said third transistors includes a fifth transistor configured as an emitter-follower amplifier.

14. The apparatus recited in claim 3 wherein said amplifying means includes a transistor having its collector coupled to said image reproducing device; and wherein said clamping means includes means for capacitively coupling said chrominance signals to the base of said first mentioned transistor, and another transistor having its base direct current coupled to the emitter of said first mentioned transistor, its collector coupled to the base of said first mentioned transistor, and its emitter coupled to said gating means.

* * * * *